(12) United States Patent
Nieuwoudt et al.

(10) Patent No.: US 12,515,190 B2
(45) Date of Patent: Jan. 6, 2026

(54) HEAT TRANSFER PACKING ELEMENT

(71) Applicant: KNIGHT MATERIAL TECHNOLOGIES LLC, Canton, OH (US)

(72) Inventors: Izak Nieuwoudt, Canton, OH (US); Karl-Heinz Schofalvi, Canton, OH (US)

(73) Assignee: KNIGHT MATERIAL TECHNOLOGIES LLC, East Canton, OH (US)

( * ) Notice: Subject to any disclaimer, the term of this patent is extended or adjusted under 35 U.S.C. 154(b) by 313 days.

(21) Appl. No.: 17/993,397

(22) Filed: Nov. 23, 2022

(65) Prior Publication Data

US 2023/0158472 A1    May 25, 2023

Related U.S. Application Data

(60) Provisional application No. 63/283,134, filed on Nov. 24, 2021.

(51) Int. Cl.
*B01J 19/30* (2006.01)

(52) U.S. Cl.
CPC ...... *B01J 19/30* (2013.01); *B01J 2219/30242* (2013.01); *B01J 2219/30416* (2013.01); *B01J 2219/312* (2013.01)

(58) Field of Classification Search
CPC .............. B01J 19/30; B01J 2219/30242; B01J 2219/30416; B01J 2219/312; B01J 2219/30223; B01J 2219/30296
USPC ............................................ 261/95, DIG. 72
See application file for complete search history.

(56) References Cited

U.S. PATENT DOCUMENTS

| | | | | | |
|---|---|---|---|---|---|
| 556,040 | A | * | 3/1896 | Alberger | B01J 19/30 |
| | | | | | 159/13.4 |
| 578,548 | A | * | 3/1897 | Deruelle | B01J 19/30 |
| | | | | | 261/95 |
| 1,173,187 | A | * | 2/1916 | Hechenbleikner | B01J 19/30 |
| | | | | | 261/95 |
| 1,480,463 | A | * | 1/1924 | Petzel | B01J 19/30 |
| | | | | | 261/95 |

(Continued)

FOREIGN PATENT DOCUMENTS

| | | | |
|---|---|---|---|
| CN | 105307767 A | * | 2/2016 |
| DE | 20210697 U1 | * | 7/2002 |

(Continued)

OTHER PUBLICATIONS

English Machine Translation of SE 517400 C2 (Year: 2002).*

(Continued)

*Primary Examiner* — Charles S Bushey
(74) *Attorney, Agent, or Firm* — Tucker Ellis LLP

(57) ABSTRACT

A packing element for use in a heat exchange or mass transfer tower includes a barrel and a plurality of fins spaced around a circumference of the barrel, each fin having a height approximately equal to a height of the barrel and a length extending radially from the barrel, a proximate end of each fin attached perpendicularly to the barrel. A protrusion extends outward from the distal end or each fin along its height. A method for mass transfer includes passing fluids through a vessel packed with randomly arranged packing elements.

16 Claims, 6 Drawing Sheets

(56) References Cited

U.S. PATENT DOCUMENTS

| | | | | |
|---|---|---|---|---|
| 1,676,451 A * | 7/1928 | Lilge | F23M 20/00 | |
| | | | 261/95 | |
| 1,947,777 A * | 2/1934 | Huff | F28F 25/085 | |
| | | | 48/80 | |
| 2,172,714 A * | 9/1939 | Schack et al. | F28D 17/02 | |
| | | | 165/DIG. 21 | |
| 2,709,128 A * | 5/1955 | Krause | B01J 19/32 | |
| | | | 261/95 | |
| 2,867,425 A * | 1/1959 | Teller | B01J 19/30 | |
| | | | 261/95 | |
| 3,481,455 A * | 12/1969 | Graham | B65D 81/09 | |
| | | | 217/53 | |
| 3,957,931 A * | 5/1976 | Ellis | C02F 3/10 | |
| | | | 210/150 | |
| 4,115,269 A * | 9/1978 | Bennett | F28F 25/08 | |
| | | | 210/150 | |
| 4,122,011 A * | 10/1978 | Strigle, Jr. | B01J 19/30 | |
| | | | 210/150 | |
| 4,333,893 A * | 6/1982 | Clyde | B01J 19/30 | |
| | | | 210/150 | |
| 4,385,988 A * | 5/1983 | Hypponen | C02F 3/10 | |
| | | | D23/209 | |
| 4,522,767 A * | 6/1985 | Billet | B01J 19/30 | |
| | | | 261/DIG. 72 | |
| 4,668,442 A * | 5/1987 | Lang | F28F 25/08 | |
| | | | 261/DIG. 72 | |
| 5,304,423 A * | 4/1994 | Niknafs | B01J 19/30 | |
| | | | 210/150 | |
| 5,543,039 A * | 8/1996 | Odegaard | C02F 3/085 | |
| | | | 261/95 | |
| 5,779,886 A * | 7/1998 | Couture | B01F 23/2342 | |
| | | | 210/150 | |
| 6,007,915 A * | 12/1999 | Rukovena | B01J 19/30 | |
| | | | 428/397 | |
| 6,447,675 B1 * | 9/2002 | James | C02F 3/06 | |
| | | | 210/150 | |
| 6,726,838 B2 * | 4/2004 | Shechter | C12M 25/14 | |
| | | | 210/197 | |
| 7,775,507 B2 * | 8/2010 | Niknafs | B01J 19/30 | |
| | | | 261/DIG. 72 | |
| 8,088,278 B2 * | 1/2012 | Poltorak | C02F 3/2806 | |
| | | | 210/150 | |
| 8,241,717 B1 * | 8/2012 | Anderson | C02F 3/106 | |
| | | | 261/95 | |
| 8,747,532 B2 * | 6/2014 | Chang | B01J 19/30 | |
| | | | 96/290 | |
| 2004/0041284 A1 * | 3/2004 | Lau | B01J 19/30 | |
| | | | 261/DIG. 72 | |
| 2007/0182035 A1 * | 8/2007 | Kavolik | B01J 19/30 | |
| | | | 261/DIG. 72 | |
| 2008/0093751 A1 * | 4/2008 | Miller | B01J 19/30 | |
| | | | 261/DIG. 72 | |
| 2008/0164625 A1 * | 7/2008 | Niknafs | B01J 19/30 | |
| | | | 261/DIG. 72 | |

FOREIGN PATENT DOCUMENTS

| | | | | |
|---|---|---|---|---|
| ES | 2323038 A1 * | 7/2009 | | |
| GB | 2132503 A * | 7/1984 | | B01D 53/84 |
| GB | 2299076 A * | 9/1996 | | |
| JP | 2-119931 A * | 5/1990 | | |
| JP | 2003-55562 A * | 2/2003 | | |
| SE | 517400 C2 * | 6/2002 | | |
| WO | WO 95/25072 * | 9/1995 | | |

OTHER PUBLICATIONS

English Machine Translation of DE 20210697 U1 (Year: 2002).*
English Abstract of JP 2003-55562 A (Year: 2003).*
English Machine Translation of ES 2323038 A1 (Year: 2009).*
English Machine Translation of CN 105307767 A (Year: 2016).*

* cited by examiner

HEAT TRANSFER PACKING ELEMENT

CROSS-REFERENCE TO RELATED APPLICATIONS

This application claims priority from U.S. Provisional Application Ser. No. 63/283,134 filed Nov. 24, 2021, and entitled "Heat Transfer Packing Element," which is hereby incorporated by reference.

TECHNICAL FIELD

This present disclosure relates generally to heat transfer media, and more particularly to packing elements for use in packed beds of a heat-exchange apparatus.

BACKGROUND

Several operations in the chemical process industry require transferring a fluid medium through a process vessel to effect a change in the fluid medium. As used herein, a fluid medium may be a gas or a liquid. A process vessel may be filled with a quantity of packing elements to create a packed bed through which the fluid media is transferred during an operation. The shape and packing arrangement of the packing elements may have a significant impact several aspects of the process, including the pressure drop across the packed bed and the amount of heat exchanged between the fluid media and the packing elements.

An exemplary application for a packed bed is as a heat transfer media used with a regenerative thermal oxidizer (RTO). RTOs are commonly used to convert pollutants in a contaminated vapor stream into less harmful combustion products prior to discharge of the vapor stream to an environment.

Regenerative thermal oxidizers typically include a combustion chamber in which a contaminated vapor stream is subjected to a process where oxidization of the pollutants in the vapor stream occurs. In addition, RTOs typically include two or more heat transfer columns which increase the efficiency of the oxidation process in the combustion chamber by using the hot combusted vapor stream from the combustion chamber to preheat a first heat transfer column. The contaminated vapor stream is then passed through the preheated first heat transfer column prior to entering the combustion chamber so that heat is transferred from the packing elements in the first heat transfer column to the contaminated vapor stream. While the contaminated vapor stream is passing through the first heat transfer column, the hot combusted vapor stream is being directed through second heat transfer media in a second heat transfer column to cause heating thereof. The combusted and contaminated vapor streams may alternate between the first and second heat transfer columns. The packing elements absorb heat from the combusted vapor stream and subsequently transfer the heat to the contaminated vapor stream.

Desirable characteristics of the packing material used in a packed bed are a low pressure drop for the gas flowing through the bed and high efficiency in transferring heat to and from the gas stream. These characteristics are influenced by the surface area of the packing element for contact with the gas stream. In addition, a packing element design should not pack tightly together or nest closely to avoid restricting fluid flow through the packed bed.

SUMMARY OF THE EMBODIMENTS

A packing element optimizes surface area and packing behavior while maintaining mechanical strength of the packing element.

In a first aspect, a packing element for use in a heat exchange or mass transfer tower optimizes surface area and packing behavior while maintaining mechanical strength of the packing element. The packing element includes a barrel and a plurality of fins spaced around a circumference of the barrel, each fin having a height approximately equal to a height of the barrel and a length extending radially from the barrel, a proximate end of each fin attached perpendicularly to the barrel.

In a second aspect, a method for mass transfer includes passing fluids through a vessel packed with randomly arranged packing elements.

DETAILED DESCRIPTION OF THE EMBODIMENTS

The principles according to the present disclosure may have particular application to heat transfer media for regenerative thermal oxidizers, and thus will be described below chiefly in this context. It is also understood, however, that principles and aspects according to the present disclosure may be applicable to heat transfer media for other regenerative heat exchange systems, or other systems used to convert pollutants of a contaminated vapor stream into less harmful combustion products prior to discharge of the vapor stream to the environment, such as thermal oxidizers, flare thermal oxidizers, catalytic oxidizers, recuperative oxidizers, or the like.

In the discussion above and to follow, the terms "upper", "lower", "top", "bottom," "end," "inner," "left," "right," "above," "below," "horizontal," "vertical," "longitudinal," "lateral," etc. refer to an exemplary stackable plate, or an exemplary heat transfer block, as viewed in a horizontal position, for example. This is done realizing that these units, such as when used in a regenerative thermal oxidizer, can be packed sideways or on various ends, or can be provided in various other positions. Furthermore, it is understood that the terms "upstream," "downstream," "leading," and "trailing" refer to the arrangement of an exemplary stackable plate or an exemplary heat transfer block as fluid flows in an overall direction through a heat transfer column of a regenerative thermal oxidizer. Such an overall direction of fluid flow is shown generally in the various figures with reference to the directional arrows designated "F." This is done realizing that fluid may flow in various other directions depending on the orientation of the units in the heat transfer column, or the direction of flow through the heat transfer column.

Figure 1:
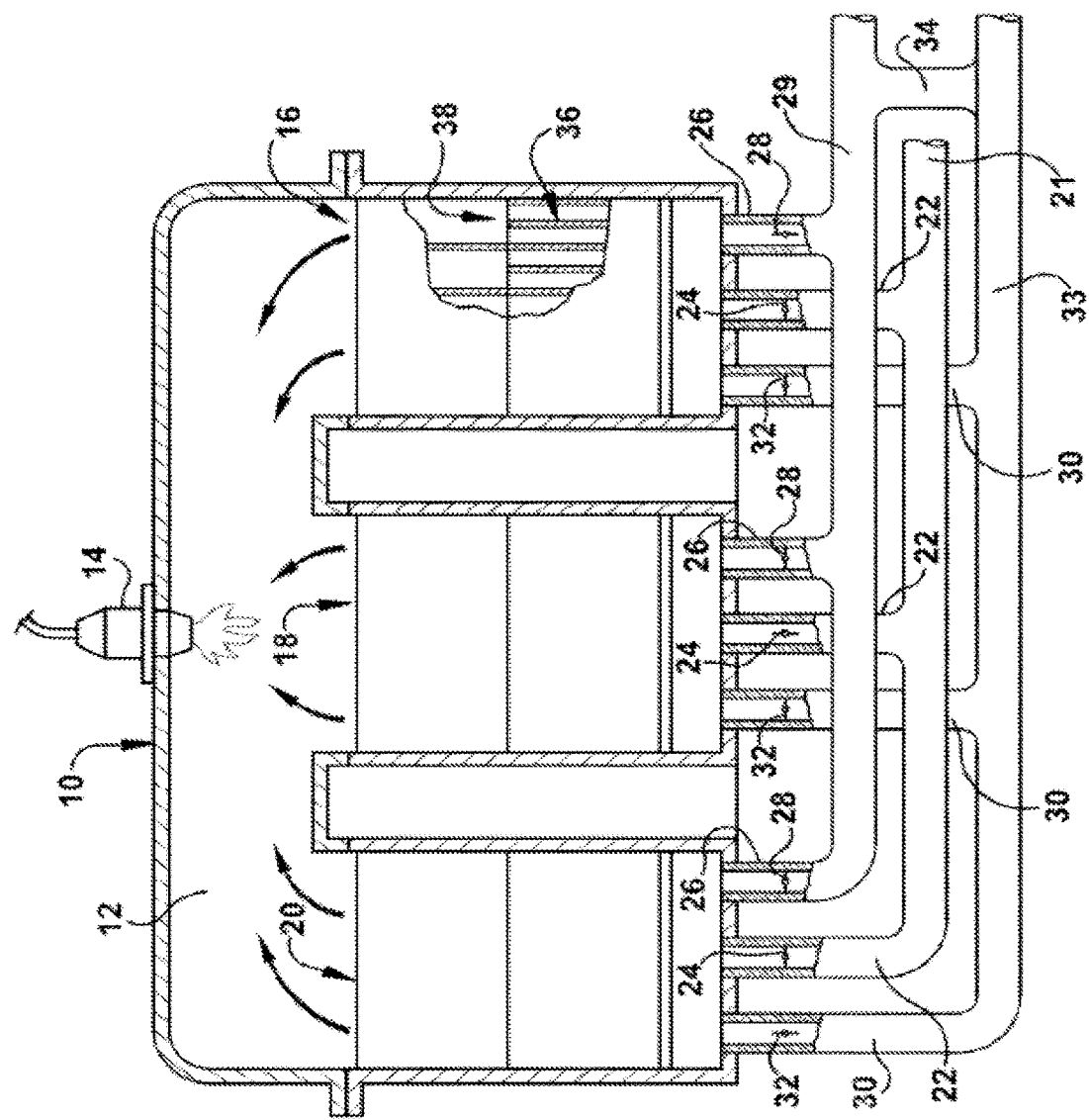
FIG. 1 is a fragmentary schematic side view of an exemplary regenerative thermal oxidizer with mass transfer columns, in embodiments.

Turning now to FIG. 1, a representative regenerative thermal oxidizer (RTO) 10 is shown. RTO 10 is used to remove pollutants contained in a vapor stream by oxidizing them, and typically converting them into carbon dioxide and water. The regenerative thermal oxidizer 10 comprises a single combustion chamber 12 containing a burner 14 which causes oxidation of the pollutant-laden or contaminated vapor stream to form a clean vapor stream. RTO 10 also includes three separate heat transfer columns 16, 18 and 20 which are in fluid flow communication with the combustion chamber 12 and through which the contaminated vapor stream and clean vapor stream alternately flow on their way to and from the combustion chamber.

The contaminated vapor stream may be directed from its source to each of the heat transfer columns 16, 18 and 20 through a supply line 21 and separate inlet lines 22 containing flow control valves 24. The clean vapor stream may be removed from the heat transfer columns by separate outlet lines 26 which also contain flow control valves 28 and feed a common discharge line 29. A purge gas may also be directed to the heat transfer columns through separate inlet purge lines 30 containing flow control valves 32 and connected to a common supply line 33. A portion of the clean vapor stream may be used as the source of the purge gas and a tap line 34 is provided between the clean vapor stream discharge line 29 and purge gas supply line 33 for this purpose.

The contaminated vapor stream flows through supply line 21 and is fed through inlet line 22 into the center heat transfer column 18. The contaminated vapor stream flows through the heat transfer column 18 and undergoes heat exchange before it enters the combustion chamber 12 where it is combusted to form the clean vapor stream. The clean vapor stream is removed from combustion chamber 12 through the adjacent heat transfer column 16 and is then removed from the column through outlet line 26 and discharge line 29. Purge gas may be concurrently fed to the other heat transfer column 20 through supply line 33 and purge line 30. As the purge gas passes through the heat transfer column 20, it removes any contaminated vapor from the column 20 and carries it to the combustion chamber 12 for cleaning. The flow paths of the vapor streams as described above are regulated by selective opening and closing of the flow control valves 24, 28 and 32.

Because the clean vapor stream leaves the combustion chamber 12 at a high temperature, it is desirable to transfer heat from the clean vapor stream to the contaminated vapor stream to improve process efficiency. This is achieved by manipulating the flow control valves 24, 28 and 32 to cause the contaminated vapor stream to be redirected from heat transfer column 18 to the heat transfer column 16 which has been heated by the clean vapor stream. As the contaminated vapor stream flows through the heated column 16 it increases in temperature until it exits the column and enters the combustion chamber 12 at a much hotter temperature than when it entered the column. At the same time, the clean vapor stream is redirected from heat transfer column 16 to heat transfer column 20 which has been purged of contaminated vapor. The clean vapor stream enters heat transfer column 20 from combustion chamber 12 at a very high temperature and then exits the opposite end of the column 20 at a reduced temperature, having undergone heat exchange within the column 20. Purge gas is in turn directed through column 18 to remove residues of the contaminated vapor stream.

It will be appreciated that after a period of time, column 16 through which the contaminated vapor stream is flowing will have cooled as a result of heat exchange such that it does not provide the desired degree of preheating of the contaminated vapor stream. The contaminated vapor stream must then be switched to column 20 which has been heated by the clean vapor stream. The clean vapor stream is concurrently redirected to the purged heat transfer column 18 and purge gas is directed to the cooled column 16 to remove residue of the contaminated vapor stream. This repeated cycling of the vapor streams among the heat transfer columns allows the regenerative thermal oxidizer to be continuously operated while providing for indirect heat exchange between the respective vapor streams.

It is understood that the placement of the combustion chamber 12 in relation to the heat transfer columns 16, 18 and 20 can be varied from the illustrated embodiment. For example, the combustion chamber 12 could be placed below or to either side of the heat transfer columns. When the combustion chamber is to one side of the columns the flow through the columns is generally horizontal.

As a representative example of a regenerative thermal oxidizer, each of transfer columns 16, 18 and 20 include heat transfer blocks 36. Generally, a heat transfer block 36 includes solid surfaces that define fluid flow passages 38 for enabling fluid passing therethrough to undergo heat exchange as the fluid flows through the passages. However, other arrangements of heat transfer media are possible, such as a packed bed of packing elements.

Figure 2:
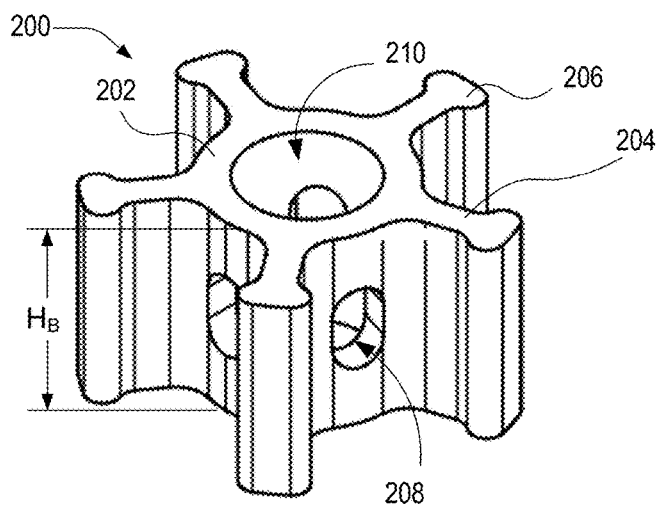
FIG. 2 is a perspective view of a heat transfer packing element, in embodiments.
Figure 3:
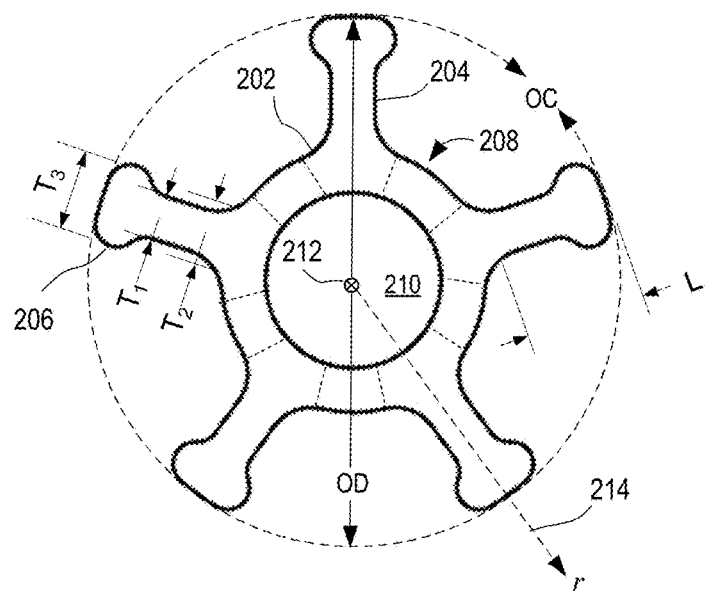
FIG. 3 is a top view of the heat transfer packing element of FIG. 2.
Figure 4:
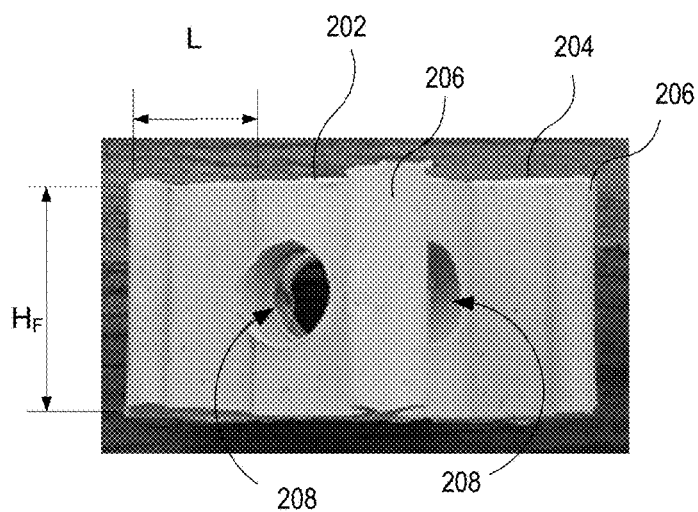
FIG. 4 is a side view of the heat transfer packing element of FIG. 2.

FIG. 2 is a perspective view of a heat transfer packing element. FIG. 3 is a top view and FIG. 4 is a side view of the heat transfer packing element of FIG. 2. FIGS. 2-4 are best viewed together in the following discussion.

Packing element 200 includes a barrel 202 having a central axis 212 and a radial axis 214 perpendicular to central axis 212. A plurality of fins 204 are positioned around the circumference of barrel 202. In an embodiment, packing element 200 is depicted with five fins 204 but any number between three and seven may be used. Barrel 202 is generally cylindrical with a height $H_B$ along central axis 212. Barrel 202 is open on both ends, with an interior cavity 210. In embodiments, height $H_B$ is approximately one inch but any height between approximately 0.5 and 2 inches may be used.

Fins 204 have a height $H_F$ and a length L along radial axis 214. Height $H_F$ is approximately the same as height $H_B$ but may be greater or less than $H_B$, ranging from approximately 0.25 inches to 2 inches. In embodiments, length L is approximately 0.5 inches but any length between approximately 0.25 inches to 1 inch may be used. A proximate end of each fin 204 relative to central axis 212 is attached to barrel 202 perpendicularly to a tangent of a circumference of the barrel at the attachment point. In embodiments, fins 204 are spaced evenly around the circumference of barrel 202. Each fin 204 has a thickness $T_1$ along most of its length L. In embodiments, fin 204 has a slightly larger thickness $T_2 > T_1$ where it is attached to barrel 202. The extra thickness provides a stronger attachment between fin 204 and barrel 202 to help prevent fins from breaking off. In embodiments, thickness $T_1$ may be approximately 0.125 to 0.375 inches.

The distal end of each fin 204 has a protrusion 206 which may extend away from fin 204 in a direction perpendicular to radial axis 214. In embodiments, protrusion 206 may extend along the full height of fin 204. As depicted in FIGS.

2-4, protrusion 206 has a generally oval cross-section along the height $H_F$ of fin 204, and a thickness $T_3$ the extends perpendicularly from both sides of fin 204. In embodiments, $T_3$ may be approximately equal to $T_1$ up to about 2.5 times $T_1$. Protrusion 206 assists with vapor flow through a packed bed of packing elements 200. Without protrusion 206, fins 204 would be flat and thus, packing elements 200 may load in a way that fins from different packing elements 200 could rest against each other without a gap between. This may make the faces that touch less ineffective since it would be more difficult for vapor to flow between them. Protrusions 206 prevent this face-to-face contact. Additionally, protrusions 206 make fins 204 stronger and more resistant to breakage.

Figure 9:
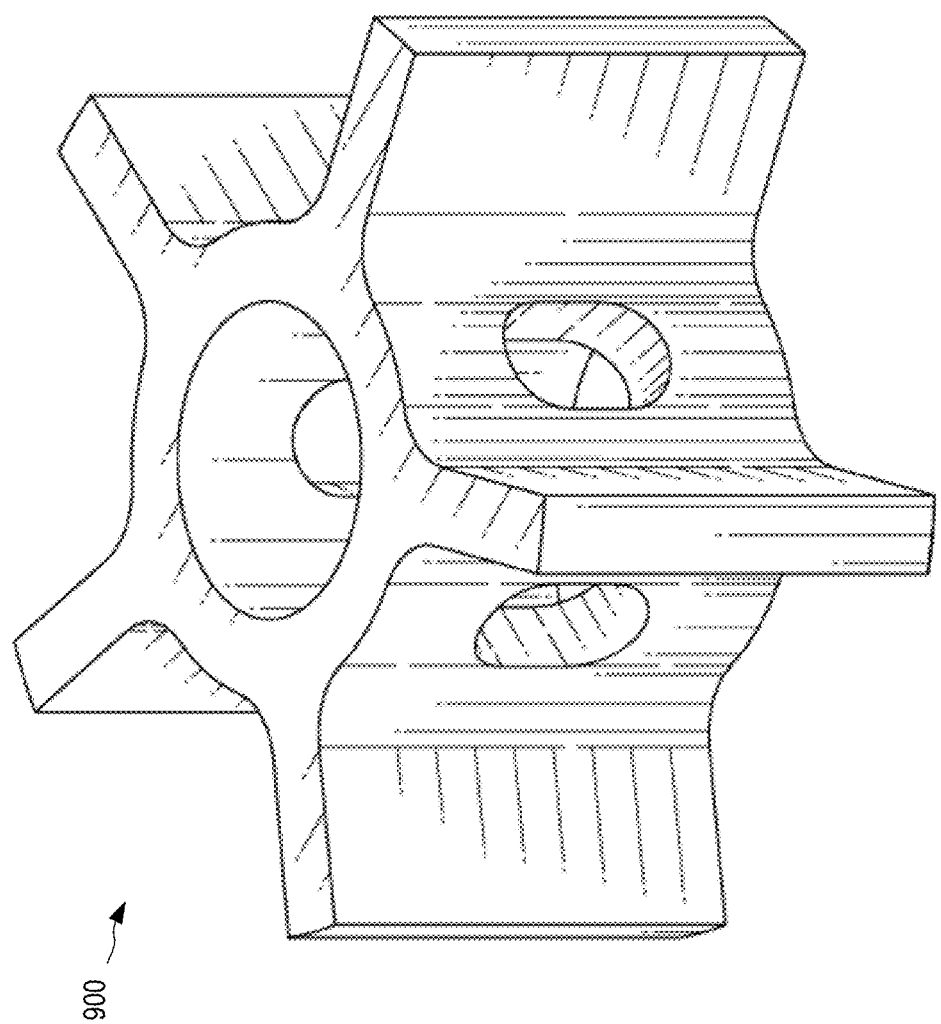
FIG. 9 is a perspective view of a heat transfer packing element, in embodiments.

Although protrusions 206 are shown in FIGS. 2-4 with a certain cross-section, this is for the purposes of illustrating principles disclosed herein. In embodiments, protrusions 206 may have other cross-sections, such as a circle or diamond, for example. In embodiments, packing elements 200 may not include protrusions 206, as shown for packing element 900 shown in FIG. 9, which is an example of the packing element 200. Packing element 900 includes all of the features of packing element 200 except protrusions 206, and thus the description of packing element 200 applies equally to packing element 900. For clarity of illustration, axis 214 and various dimensions are shown for one of fins 204 but may apply to all fins 204 attached to barrel 202.

In embodiments, barrel 202 includes radial holes 208 between fins 204. Radial holes 208 provide a passage between interior cavity 210 and the exterior of packing element 200. As shown, radial holes 208 are centered at approximately a midpoint of height $H_B$ and have an oblong shape, although any shape for radial holes 208 may be used. Radial holes 208 provide an additional flow path through a packed bed of packing elements 200. These additional flow paths ensure that all parts of packing element 200 take part in the heat transfer process, and also reduce the pressure drop across the packed bed. As shown in FIG. 3 the number of radial holes 208 is the same as the number of fins 204, but more or fewer radial holes may be used.

Collectively, fins 204 define an outer circumference OC and an outer diameter OD of packing element 200. Outer diameter OD may be between approximately 0.5 and 6 inches. The ratio of outer diameter OD to height $H_B$ defines an aspect ratio for packing element 200. The aspect ratio of packing element 200 affects the way the packing element loads into a bed, which affects the performance. In embodiments, an aspect ratio of packing element 200 is 1:1 but any aspect ratio up to 3:1 may be used.

In embodiments, packing element 200 is a ceramic product. Ceramic has performance advantages over plastic and metal, for example, in that it can withstand higher temperatures and has a greater capacity to absorb and release heat, however, any suitable material may be used depending on the fluid media and expected operational temperatures.

The barrel and fin configuration of packing element 200 provides several advantages. By providing fins with a shaped protrusion on the distal ends, a plurality of packing elements 200 may be randomly installed in a packed bed or transfer column to provide minimum pressure drop during a heat transfer process while maximizing the available surface area for contact with a fluid medium. In addition, the construction of packing element 200 accomplishes these objectives without sacrificing the strength of the element. Radial holes through the barrel are sized to facilitate drainage of a fluid medium through the packed bed without weakening the barrel and increasing the likelihood that the element will break during use.

Figure 6:
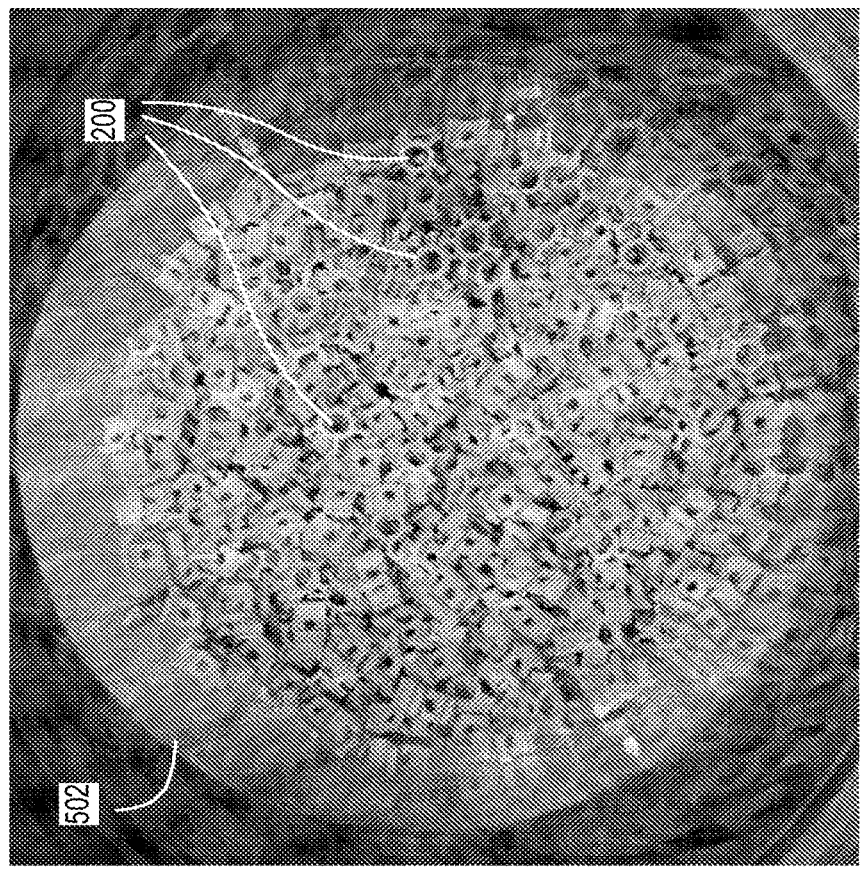
FIG. 6 is a top view of the mass transfer column of FIG. 2.
Figure 5:
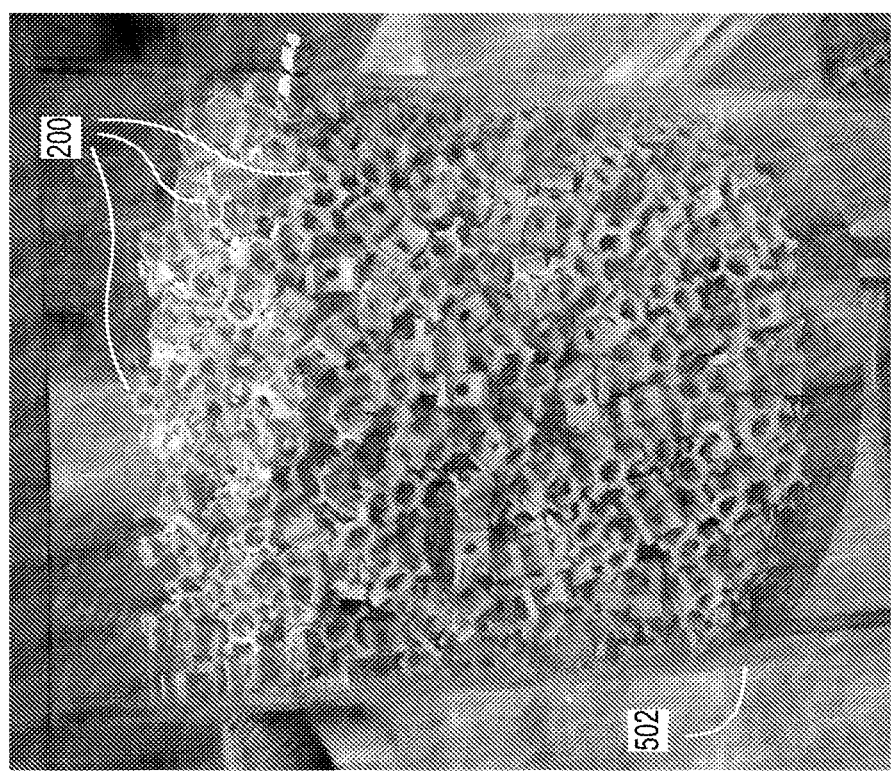
FIG. 5 is a side view of a exemplary mass transfer column with a packed bed of heat transfer elements, in embodiments.
Figure 7:
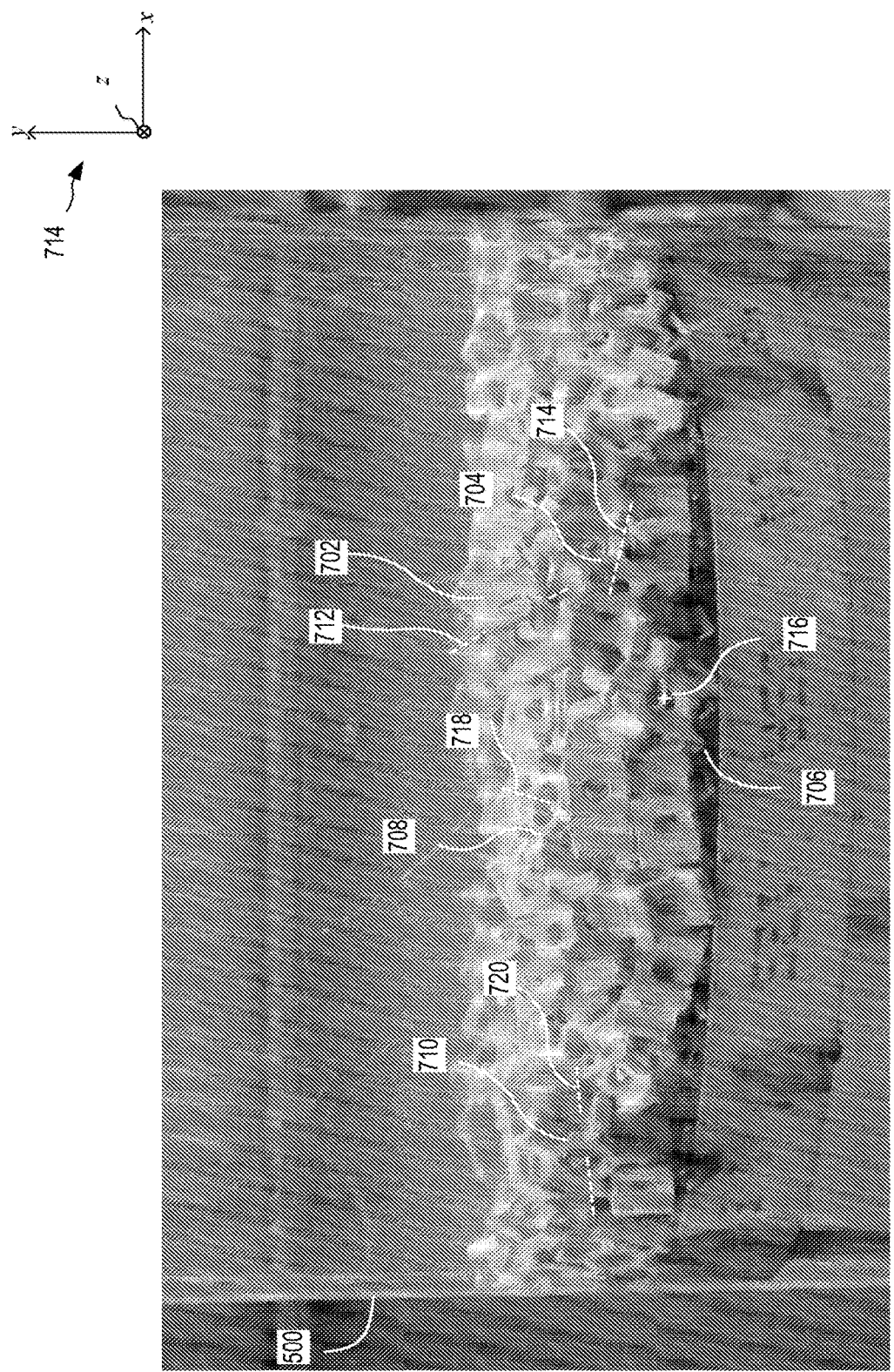
FIG. 7 is a more detailed side view of the mass transfer column of FIG. 5.

FIG. 5 is a side view of a mass transfer column with a packed bed of heat transfer packing elements 200. FIG. 6 is a top view of the mass transfer column of FIG. 5. FIG. 7 is a more detailed view of FIG. 5, in embodiments. FIGS. 5-7 are best viewed together in the following discussion. The mass transfer column of FIGS. 5-7 is an example of columns 16, 18 and 20 of FIG. 1. Embodiments discussed herein are exemplary and it should be understood that packing element 200 may be used similarly in a wide variety of industrial applications where it is desirable to transfer heat from one fluid to another.

Mass transfer column 500 as depicted is generally cylindrical, with a perimeter wall 502. In embodiments, a circular cross-section is not required, and other cross-sections are contemplated. Mass transfer column 500 may also include additional components and structural features that are not shown in FIGS. 5-7. A quantity of packing elements 200 are randomly arranged through a height of mass transfer column 500 by generally placing them into mass transfer column 500 and leveling by any suitable method. A fluid medium may be passed through mass transfer column 500 in either an upward or a downward direction relative to the axis of the column. In embodiments, a fluid medium may enter mass transfer column 500 from a side of the column. The quantity of packing elements 200 depicted in FIGS. 5 and 6 is representative and any quantity may be used.

Packing elements 200 have a barrel and fin arrangement that provides mechanical strength with reduced nesting which improves fluid flow through mass transfer column 500. Packing elements 200 are randomly placed in mass transfer column 500 such that there is no common orientation for adjacent packing elements 200 or groups of packing elements. Any two adjacent packing elements 200 may have different spatial orientations as explained in connection with FIG. 7.

FIG. 7 illustrates a quantity of packing elements 200, and specifically identifies packing elements 702, 704, 706, 708 and 710 to illustrate how the structure of packing element 200 reduces nesting and packing density. To illustrate principles discussed herein, five packing elements are identified but all packing elements in FIG. 7, as well as FIGS. 5 and 6, are examples of packing element 200. As shown, packing element 702 has a central axis 712, packing element 704 has a central axis 713, and packing element 706 has a central axis 716. Likewise, packing element 708 has a central axis 718 and packing element 710 has a central axis 720 Central axes 710, 712, 714, 716 and 720 are examples of central axis 212. As shown in FIG. 7, axes 710, 712, 714, 716 and 720 have random orientations with respect to three-dimensional axis 714 in that their orientations different in all three dimensions relative to each other.

Once placed in a packed bed, packing elements having different design parameters may be compared to each other based on their specific surface area, which may be evaluated based on the pressure drop across the packed bed in the direction of fluid flow. The lower the pressure drop across the bed; the less energy is required to force fluid through the bed and operate the unit.

Figure 8:
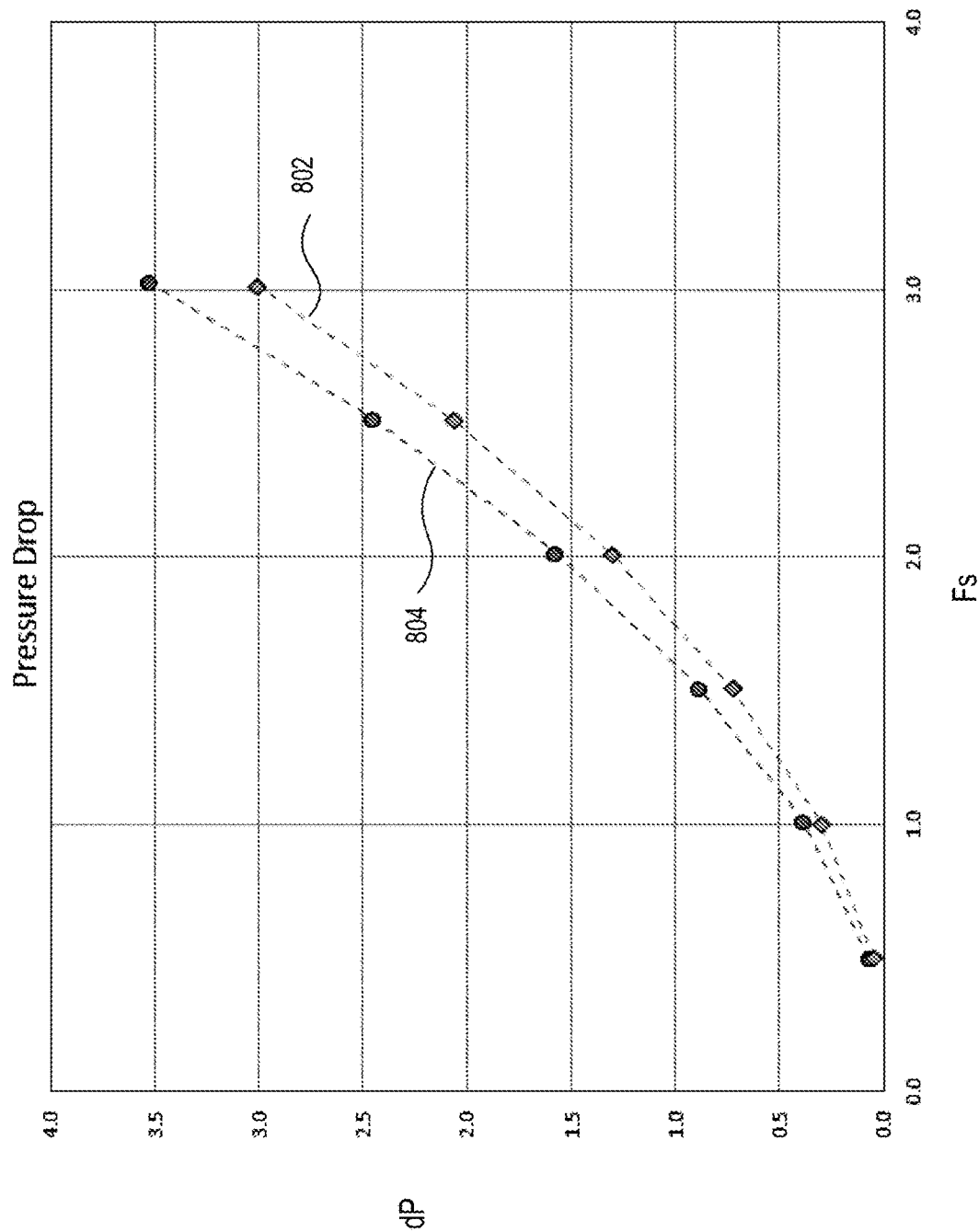
FIG. 8 is a graph of pressure drop per air velocity for a packed bed of FIG. 5, in embodiments.

FIG. 8 is a graph of pressure drop (dP, mmHg/ft) versus air velocity (Fs, $(ft/s)(lb/ft^3)^{0.5}$) for a packed bed of packing elements 200 as compared with a prior art packing element, for example the packing element disclosed in U.S. Pat. No. 6,547,222. FIG. 8 shows the performance of packing element 200 as line 802 and the performance of a prior art packing element as line 804. As shown in the graph of FIG.

8, packing element 200 has a 15% lower pressure drop and 15% greater efficiency than a prior art packing element. Data supporting the graph of FIG. 8 is shown in Table 1:

TABLE 1

| Prior Art Packing Element | | Packing Element 200 | |
|---|---|---|---|
| Fs | dP | Fs | dP |
| 0.499 | 0.069 | 0.502 | 0.046 |
| 1.009 | 0.385 | 1.002 | 0.304 |
| 1.510 | 0.885 | 1.505 | 0.722 |
| 2.013 | 1.568 | 2.005 | 1.304 |
| 2.521 | 2.452 | 2.510 | 2.068 |
| 3.027 | 3.525 | 3.016 | 3.010 |

In embodiments, packing elements 200 have a higher specific surface area than the prior art packing element, as shown in Table 2. This contributes to the lower pressure drop across a packed bed of packing elements 200, as shown FIG. 8.

TABLE 2

| Name | Piece Area [in2] | Piece Volume [in3] | Piece Density [pcs/ft3] | Specific Surface Area [ft2/ft3] | Void Fraction |
|---|---|---|---|---|---|
| Prior Art | 7.20 | 0.356 | 1230 | 61.53 | 0.747 |
| Packing Element 200 | 7.13 | 0.377 | 1309 | 64.82 | 0.714 |

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated: (a) the adjective "exemplary" means serving as an example, instance, or illustration, and (b) the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A packing element for use in a heat exchange or mass transfer tower, said packing element comprising:
    a cylindrical barrel having a central axis; and
    a plurality of fins extending radially from a circumference of the cylindrical barrel, wherein each fin has a thickness $T_1$ along most of its length L, and each fin further comprises a protrusion on a distal end of the fin, the protrusion extending outward from the fin perpendicularly to the fin's length L, the protrusion having an obround cross section, and wherein the protrusion extends along a height $H_F$ of the fins and has a thickness $T_3$ where $T_3 > T_1$.

2. The packing element of claim 1, wherein the barrel has a height $H_B$; and
    each fin's height $H_F$ is approximately equal to the height $H_B$ and the length L, a proximate end of each fin attached to the barrel.

3. The packing element of claim 2, wherein the height $H_B$ is between approximately 0.5 and 2 inches.

4. The packing element of claim 2, wherein the length L is between approximately 0.25 and 1 inch.

5. The packing element of claim 2, wherein the packing element further comprises an outer circumference OC at the distal ends of the plurality of fins and an outer diameter OD.

6. The packing element of claim 5, wherein an aspect ratio of OD/$H_B$ is between 1:1 and 3:1.

7. The packing element of claim 1, wherein the thickness of the plurality of fins at the proximate end is $T_2$ where $T_2 > T_1$.

8. The packing element of claim 1, wherein the barrel further comprises one or more radial holes between the plurality of fins.

9. The packing element of claim 1, further comprising five fins spaced evenly around the barrel.

10. The packing element of claim 1, wherein the packing element is formed of a ceramic material.

11. A method of transferring heat from a first fluid to a second fluid comprising providing a plurality of packing elements of claim 1, arranging the elements as a bed thereof in a vessel, passing said first fluid through said bed, and subsequently passing said second fluid through said bed.

12. The packing element of claim 1, the fin gradually transitions to the protrusion at the distal end of the fin.

13. The packing element of claim 1, wherein the fin gradually transitions along an arcuate path to the protrusion at the distal end of the fin.

14. A packing element for use in a heat exchange or mass transfer tower, said packing element comprising:
    a cylindrical barrel having a central axis, a height, and one or more radial holes centered at a midpoint of the height; and
    a plurality of fins extending radially from a circumference of the cylindrical barrel, each fin comprising a protrusion at the distal end of the fin extending outward from the fin perpendicularly, the protrusion having an oval cross section.

15. A packing element for use in a heat exchange or mass transfer tower, said packing element comprising:
    a cylindrical barrel having a central axis; and
    a plurality of fins extending radially from a circumference of the cylindrical barrel, wherein each fin has a length, and a proximate end of each fin is attached to the barrel at an attachment point perpendicularly to a tangent of the circumference of the cylindrical barrel at the attachment point, and each fin has a thickness $T_1$ along most of its length, the fin having a thickness $T_2$ at the proximate end and $T_2 > T_1$, wherein the thickness of the fin gradually transitions from $T_2$ to $T_1$.

16. The packing element of claim 15, wherein the cylindrical barrel has a height, and one or more radial holes centered at a midpoint of the height.

* * * * *